(12) United States Patent
Shrader

(10) Patent No.: US 8,185,996 B2
(45) Date of Patent: May 29, 2012

(54) SYSTEM AND METHOD OF SOLID INK REMOVAL FOR SUBSTRATE RE-USE

(75) Inventor: Eric J. Shrader, Belmont, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 250 days.

(21) Appl. No.: 12/403,626

(22) Filed: Mar. 13, 2009

(65) Prior Publication Data

US 2010/0229889 A1  Sep. 16, 2010

(51) Int. Cl.
*B01J 19/00* (2006.01)

(52) U.S. Cl. .............................. 15/102; 15/93.1; 101/425

(58) Field of Classification Search ............. 15/102, 15/256.5, 256.51–256.53, 93.1, 93.4; 101/401.1, 101/400, 399, 347, 423, 425
See application file for complete search history.

(56) References Cited

U.S. PATENT DOCUMENTS

| | | | |
|---|---|---|---|
| 3,762,101 A | 10/1973 | Culp et al. | |
| 4,281,431 A * | 8/1981 | Nierlich et al. | 15/1.51 |
| 4,382,308 A * | 5/1983 | Curcio | 15/77 |
| 4,440,635 A | 4/1984 | Reiniger | |
| 4,993,097 A * | 2/1991 | D'Amato | 15/77 |
| 5,238,538 A | 8/1993 | Jagannadh et al. | |
| 5,306,349 A | 4/1994 | Nee | |
| 5,401,360 A | 3/1995 | Galland | |
| 5,876,559 A | 3/1999 | Srivatsa | |
| 5,997,388 A | 12/1999 | Candella et al. | |
| 6,245,195 B1 | 6/2001 | Marwah | |
| 2006/0016731 A1 | 1/2006 | Dal Maso | |

FOREIGN PATENT DOCUMENTS

| | | |
|---|---|---|
| EP | 0336059 | 10/1989 |
| JP | 2000190197 | 7/2000 |
| WO | WO09627045 | 9/1996 |

OTHER PUBLICATIONS

Computer generated English translation of JP 2000-190197, Jul. 2000.*
European Search Report dated Aug. 19, 2010 corresponding to European Patent Application No. 10156117.

* cited by examiner

*Primary Examiner* — Laura C Guidotti
(74) *Attorney, Agent, or Firm* — Marger Johnson & McCollom, P.C.

(57) ABSTRACT

A system for removing ink from a substrate. The system includes an ink separator configured to separate the ink from the substrate; and a substrate conveyor configured to provide the substrate to the ink separator. Accordingly, the ink can be removed from the substrate such that the substrate can be re-used.

11 Claims, 3 Drawing Sheets

SYSTEM AND METHOD OF SOLID INK REMOVAL FOR SUBSTRATE RE-USE

BACKGROUND

This disclosure relates to substrate re-use and, in particular to systems and methods of solid ink removal for substrate re-use.

Paper represents a very large portion of the lifecycle environmental cost of printing. Both the actual manufacture of the paper, whether formed from recycled material or virgin pulp, as well as the shipping costs are high in terms of impact to the environment. Many office documents are printed multiple times in their lifetimes and often are recycled on the day they are printed. As a result, many office documents incur an increased environmental impact over their lifetime.

Ink, toner, or the like can be removed from paper. However, conventional ink removing techniques include re-pulping of the paper. That is, the paper is shredded, disintegrated, or otherwise returned to a slurry. Agglomeration agents, densifying agents, or the like are added to cause the ink suspended in the slurry to agglomerate such that it can be removed by screening, filtering, washing, sedimentation, or the like. Once the ink is removed, the remaining slurry must reenter the papermaking process before it can be re-used. This process is typically done at a location remote to the use location and therefore this cycle incurs round trip transportation costs as well.

SUMMARY

An embodiment includes a system for removing ink from a substrate including an ink separator configured to separate the ink from the substrate; and a substrate conveyor configured to provide the substrate to the ink separator.

Another embodiment includes a method of removing solid ink from a substrate including receiving the substrate with the solid ink; mechanically separating the solid ink from the substrate; and returning the substrate.

Another embodiment includes a printing system including a coating source configured to apply a coating to a substrate; and a marking engine configured to apply ink over the coating such that the coating is disposed between the ink and the substrate.

DETAILED DESCRIPTION

Embodiments will be described in reference to the drawings. In particular, embodiments will be described where ink can be removed from a substrate such that the substrate can be re-used. That is, the substrate can be reused, reducing the costs both in dollars and in terms of environmental impact of daily printing.

In an embodiment, a synthetic substrate can be used as a substrate for a printing process. An example of such synthetic substrate is paper based on polypropylene. Although synthetic substrates can have a greater durability, synthetic substrates can have a lower ink adhesion.

Solid inks can be used in a printing process. Such solid inks can be used in high resolution applications, resulting in high quality images. However, solid inks can have poor adhesion to substrates. The undesirable low ink adhesion characteristics of synthetic substrates and solid inks can be combined to create a beneficial result. For example, the low adhesion allows the ink to be removed. In particular, as will be described below, the ink can be removed by a mechanical process. As a result, the synthetic substrate can be re-used.

Accordingly, users and in particular, users in an office environment, can print documents using solid inks on synthetic substrates. The documents can be used as desired. When finished, the user can place the document into a system for removing the ink, rather than placing the document in a recycling bin. As a result, after ink removal, the synthetic substrate can be re-used. The various costs, as described above, associated with the transportation and recycling of paper can be reduced if not eliminated.

Although a synthetic substrate has been described as being suitable, other substrates can be used. For example, a suitable substrate would have a higher mechanical strength to allow for multiple re-use. However, this does not exclude a substrate having mechanical properties that limit the application to one re-use. Such applications can still reduce the impact through a reduced recycling load of one sheet per two uses. In another example, a suitable substrate can have a reduced adhesion to a particular ink. As a result, the ink can be more readily removed. Synthetic substrates, such as a polypropylene substrate include such characteristics.

In another example, a substrate that is substantially impermeable to ink can be used. Accordingly, ink will not penetrate the surface of the substrate and therefore can have a reduced adhesion and will not impart a residual color to the substrate. As will be described in further detail below, such impermeability, synthetic substrates, or other materials that reduce the adhesion of the ink can allow for a purely mechanical removal technique.

Figure 1:
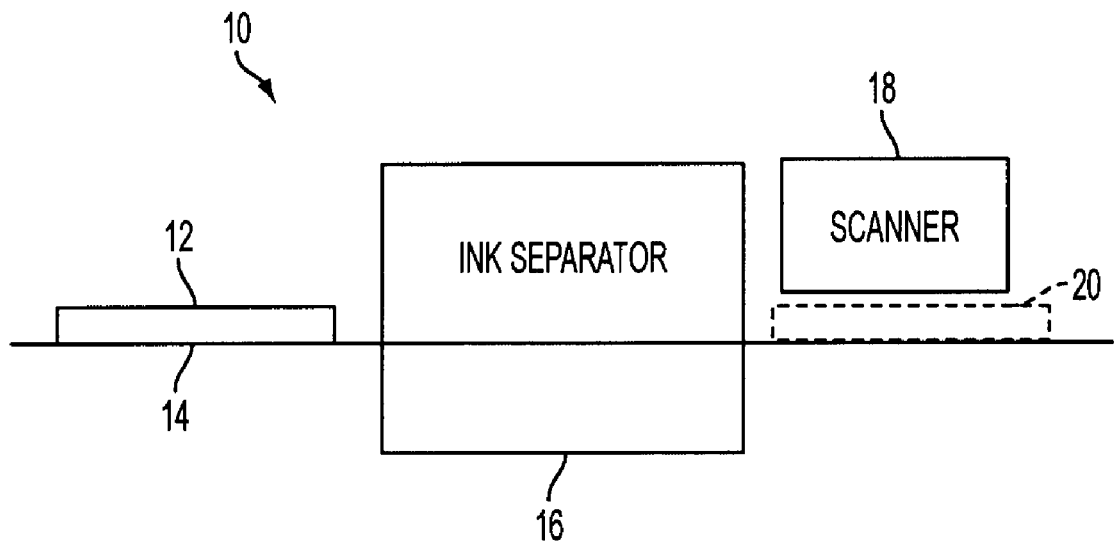
FIG. 1 is a block diagram of a system for removing ink from a substrate according to an embodiment.

FIG. 1 is a block diagram of a system for removing ink from a substrate according to an embodiment. The system 10 includes an ink separator 16 and a substrate conveyor 14. The ink separator 16 is configured to separate the ink from the substrate 14. In an embodiment, the ink separator 16 can separate the ink from the substrate 12 leaving the substrate substantially intact. That is, in an embodiment, the ink separator 16 can separate the ink without removing a portion of the substrate. As a result, the substrate 12 can be re-used.

As described above, the substrate 12 can be a synthetic substrate such as a polypropylene substrate. The ink can be a solid ink that has a low adhesion to the polypropylene substrate. As a result of the low adhesion of the solid ink to the polypropylene substrate, the ink can be removed in the ink separator 16.

The ink separator 16 can take a variety of forms. In an embodiment, the ink separator 16 is configured to mechanically separate the ink from the substrate. That is, the ink separator 16 includes a structure that makes physical contact to the substrate 12 and/or the ink to separate the ink from the substrate 12. For example, the ink separator 16 can include scrapers, blades, brushes, abrasive wheels, or the like.

In an embodiment, the ink separator 16 can include a scraper to remove substantially remove the ink from the substrate 12. However, some ink may still adhere to the substrate 12. Subsequent brushing or other removal mechanisms can be used to substantially remove the remainder of the ink.

In an embodiment, the ink separator 16 can be configured to only mechanically separate the ink from the substrate 12. As used herein, only mechanically separating the ink includes using only physical contact. That is, chemicals, heat, light, or the like are not used to separate the ink from the substrate 12. This does not mean that such techniques outside of mechanical separation cannot be applied to the substrate 12 outside of the system 10. For example, as will be described below, ink can be applied to a substrate using differing heat levels, coatings, or the like to reduce the adhesion of the ink to the substrate 12. Ink can still be separated from such substrates 12 by only mechanical separating in the system 10.

The substrate conveyor 14 is configured to provide the substrate 12 to the ink separator 16. The substrate conveyor 14 can be any variety of substrate transport mechanisms. For example, the substrate conveyor 14 can include rollers, belts, air jets, wheels, or the like. The substrate conveyor 14 can provide the substrate 12 to the ink separator 16 in a variety of ways. For example, the substrate conveyor 14 can provide tension to the substrate 12 such that the substrate 12 contacts the ink separator 16. In another embodiment, pressure can be applied by a roller to hold the substrate 12 to the ink separator 16. Regardless of how the substrate 12 is provided to the ink separator 16 the substrate conveyor 14 can then transport the substrate 12 to the user, collate the substrate 12, or otherwise prepare the substrate for subsequent collection and re-use.

In an embodiment, the system 10 includes a scanner 18. The scanner 18 is disposed after an exit of the ink separator 16 and configured to analyze ink remaining on the substrate 20, illustrated in phantom. Although the ink separator 16 has been described as substantially removing the ink from the substrate 12, some ink can remain. For example, the ink may have a higher adhesion to the substrate 12, the ink separator 16 may need maintenance, or the like. Regardless, the scanner 18 can be configured to monitor the substrate 20 to analyze any remaining ink.

Accordingly, if ink has not been sufficiently removed from the substrate 20, the substrate 20 can be directed towards the ink separator 16 again for a subsequent removal of ink. For example, the substrate conveyor 14 can be configured to route the substrate 20 to the entrance of the ink separator 16, reverse the direction of the substrate 20 back through the ink separator 16, or the like. Such ink separation and scanning can be repeatedly performed to achieve a desired level of ink removal. If a desired level of ink removal cannot be obtained, the scanner can cause the sheet to be rejected.

The system 10 can take a variety of forms. For example, the system 10 can be a stand alone system similar to a paper shredder. A slot can receive the substrate with the ink. An internal ink separator 16 removes the ink and a collection bin stores the processed substrates 12. In another example, the system 10 can be part of a printing system. For example, the printing system can direct particular substrates 12 towards an ink separator 16. Once the ink is separated from the substrate 12, the substrate 12 can be routed towards a tray accessible by the printing system for subsequent printing.

As a result, the lifetime environmental costs of printing and in particular, office printing are reduced. The energy, emissions, chemicals, and the like associated with recycling and or creation of virgin substrates can be reduced and/or eliminated. That is, with the system 10, the substrate 12 can be processed on site to remove the ink and prepared for subsequent printing. In contrast, a paper recycling-based approach would include transportation to a paper making facility, repulping, ink removal, processing into paper, and transportation back to the office. Such processing and transportation can be eliminated.

Figure 2:
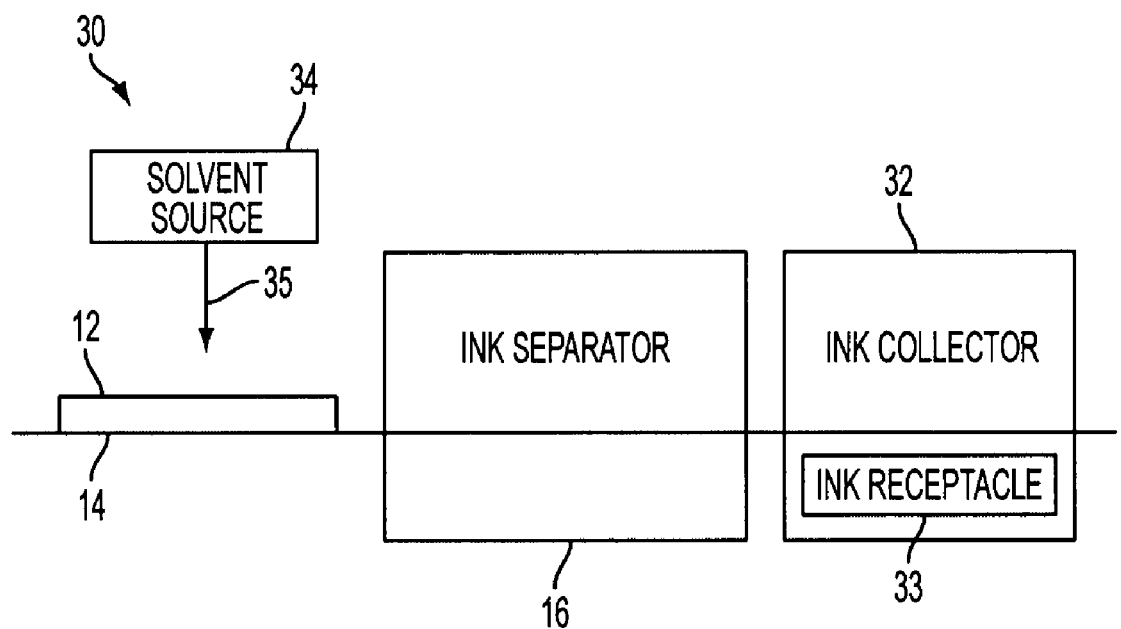
FIG. 2 is a block diagram of a system for removing ink from a substrate according to another embodiment.

FIG. 2 is a block diagram of a system for removing ink from a substrate according to another embodiment. In this embodiment, the system 30 includes an ink collector 32 configured to collect the ink removed from the substrate. For example, the ink collector 32 can include brushes, vacuums, air jets, or the like to direct the detached ink to a collection receptacle.

In an embodiment, the ink separator 16 may not completely separate the ink from the substrate 12. That is, the ink collector 32 can be configured to perform some separation of the ink from the substrate 12. In other words, the separation and collection of ink can be a combined and/or form a continuous process between the ink separator 16 and the ink collector 32. For example, as will be described in further detail below, a blade may partially remove the ink from the substrate 12. Some ink may remain that is attached to the substrate 12 yet loosened by the ink separator 16. The brushes and vacuum of the ink collector 32 can substantially remove the remaining ink and directed it towards an ink receptacle 33.

In another embodiment, a solvent can be used in the processing of the substrate 12. In this example, a solvent applicator 34 is configured to apply solvent 35 to the substrate 12. The solvent can reduce the adherence of the ink to the substrate 12, suspend the ink for easier collection, or the like. Accordingly, the ink can be removed more easily from the substrate 12. It should be noted that although in an embodiment has been described above with only mechanical separation and no solvents, chemicals, or the like, other embodiments can include such additions.

Furthermore, although the solvent applicator 34 has been illustrated as applying a solvent 35 to the substrate 12 prior to entry into the ink separator 16, the solvent applicator 34 can be disposed in other locations. For example, the solvent applicator 34 can be internal to the ink separator 16 and configured to apply the solvent 35 to a blade, scraper, or the like.

Figure 3:
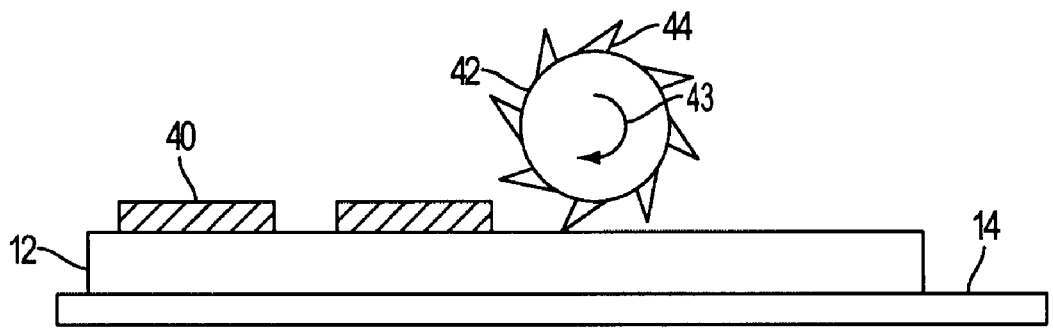
FIG. 3 is an example of an ink separator of FIG. 1.

FIG. 3 is an example of an ink separator of FIG. 1. In this embodiment, the ink separator 16 includes a blade 42. As will be described in further detail below, the blade 42 can include a single fixed blade. In this embodiment, the blade 42 includes multiple individual teeth 44. The blade 42 can be a rotating blade configured to rotate in direction 43. The teeth 44 can be disposed along the blade 42 in a helical pattern.

The blade 42 can be disposed relative to the substrate conveyor 14 such that the blade 42 can separate the ink from the substrate 12. In an embodiment, the substrate conveyor 14 can position the substrate 14 such that the blade 42 contacts the substrate. As a result, the blade 42 can remove the ink 40 down to the substrate 12.

However, in another embodiment, the blade 42 need not contact the substrate 12. For example, as described above, a solid ink can have poor adhesion to a synthetic substrate. Accordingly, the blade 42 can be disposed to contact the ink 40, yet due to the reduced adhesion of the ink 40 to the substrate 12 and the internal cohesiveness of the ink 40, the ink 40 can be pulled off of the substrate 12.

Although particular tooth pattern and direction of rotation have been described, other tooth patterns and rotation directions can be used. For example, the blade 42 can rotate in a direction opposite to direction 43. In another example, the teeth 44 can extend longitudinally along the blade 42.

In an embodiment, the hardness of the blade 42 can be selected based on the hardness of the substrate 12. For example, the blade material can be selected to have a hardness that is greater than that of the substrate 12. As a result, if the blade 42 contacts the substrate 12, the contact will have a reduced effect on the substrate 12. In addition, the blade can have a hardness that is greater than the ink on the substrate 12. As a result, the ink 40 can deform and separate from the substrate 12 while the blade 42 remains substantially intact.

Although the hardness of the blade 42 has been described as an example relative to the ink 40 and the substrate 12, such relative hardness is not limited to blades. Any structure that can contact the ink 40 and the substrate 12 during the removal of the ink can have such hardness characteristics. For example, bristles of brushes used in removal of the ink can be formed of a material with such a hardness.

Figure 4:
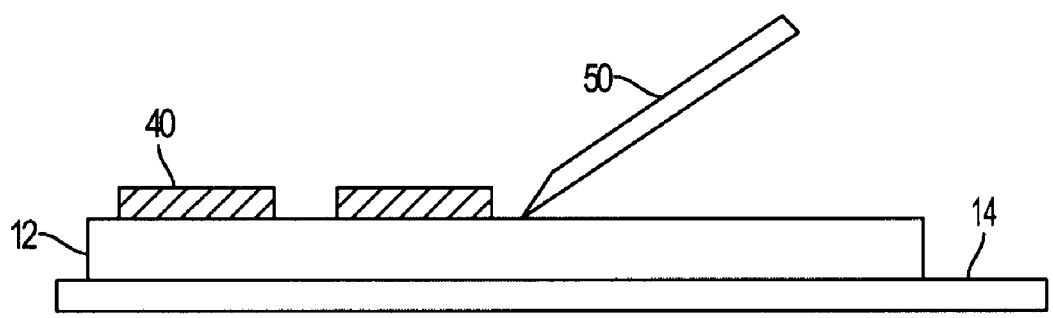
FIG. 4 is another example of an ink separator of FIG. 1.

FIG. 4 is another example of an ink separator of FIG. 1. In this embodiment, a blade 50 of the ink separator 16 is disposed such that the substrate conveyor 14 can bring the substrate 12 in contact with the blade. As the substrate 12 is moved by the substrate conveyor 14, the blade 50 contacts the ink 40 and separates it from the substrate 12.

Figure 5:
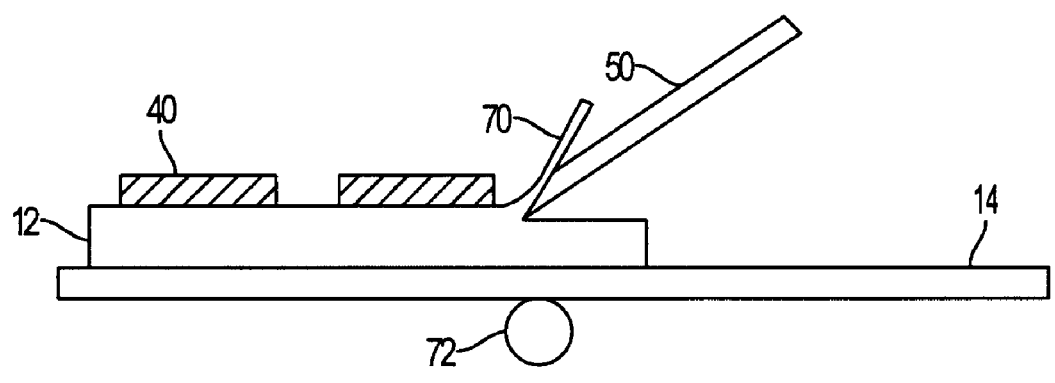
FIG. 5 is another example of an ink separator of FIG. 1.

FIG. 5 is another example of an ink separator of FIG. 1. As described above, a blade 50 can be used to separate the ink 40 from the substrate 12. However, the blade 50 can be disposed in the ink separator 16 such that is removes a potion of the substrate 12. For example, as the substrate 12 passes the blade a portion 70 is cut away. In an embodiment, a pressure controller can control the pressure between the blade 50 and the substrate conveyor 14. For example, roller 72 can be configured to apply pressure to the substrate 12.

The pressure controller can take a variety of forms. For example, the pressure controller can include pressure sensors, actuators, feedback controllers, or the like that regulates the pressure of the blade 50. In another embodiment, the pressure controller can include a spring loaded mechanism that applies a particular pressure, without such feedback or monitoring.

As described above, solid inks may have a lower adhesion to a synthetic substrate and can be removed. However, the substrate 12 may be marked with other inks or materials that have higher adhesion to the substrate. For example, a user may make notes on the substrate 12 with a pen. Such ink may adhere to the substrate 12 more than wax based inks. Mechanical techniques, such as the blades, brushes, and the like described above may not remove the ink from the pen. Accordingly, while separating the ink from the substrate, the blade 50 can also remove a portion of the substrate 12. Although this can limit the lifetime of the substrate 12, inks, marks, foreign objects, or the like that would otherwise remain on the substrate 12 can be removed, preparing the substrate for re-use.

Figure 6:
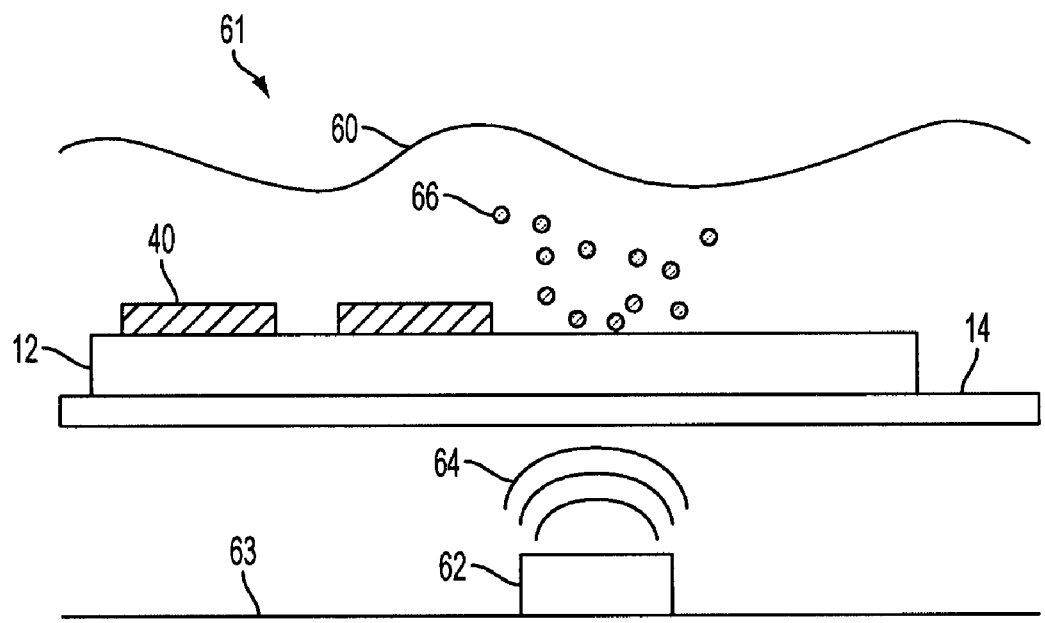
FIG. 6 is another example of an ink separator of FIG. 1.

FIG. 6 is another example of an ink separator of FIG. 1. The ink separator of FIG. 6 includes an ultrasonic cleaner 61. The substrate conveyor 14 is configured to transport the substrate 12 into a vessel 63 containing a fluid 60. At least a part of the substrate 12 is submerged in the fluid 60, although in FIG. 6, the entire substrate 12 is illustrated as being submerged.

The ultrasonic cleaner 61 includes an ultrasonic source 62. The ultrasonic source 62 is configured to emit ultrasonic vibrations 64 which propagate through the fluid 60. The ultrasonic vibrations 64 detach the ink 40 from the substrate 12 and suspend it in the fluid 60 as particles 66. The substrate 12 can then be removed from the ultrasonic cleaner 61, leaving the particles 66 behind.

Although particular techniques and structures of an ink separator 16 have been described for removing ink from a substrate, such techniques, structures, and the like can be combined together. For example, the ultrasonic cleaner 61 can be combined with a rotating blade 42. Any combination of such techniques and structures is possible.

Figure 7:
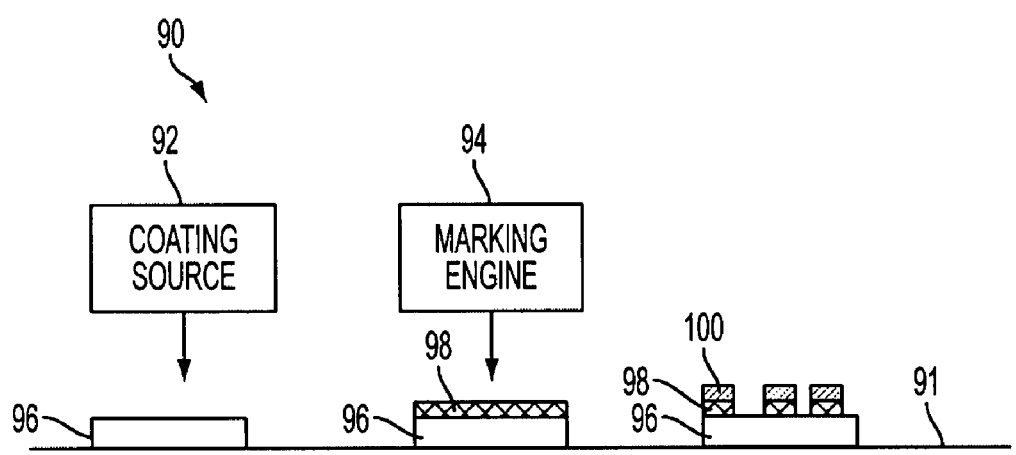
FIG. 7 is a block diagram of a system for applying ink to a substrate according to an embodiment.

FIG. 7 is a block diagram of a system for applying ink to a substrate according to an embodiment. As described above, the removal of the ink from a substrate can include the separation of the ink from the substrate without substantially affecting the substrate. The printing process can be performed such that the resulting substrate has a reduced adhesion to any applied ink.

In an embodiment, a coating can be applied to the substrate 96 in system 90. The system 90 is configured to apply ink 100 to the substrate 96. The system 90 includes a coating source 92, a substrate conveyor 91, and a marking engine 94. The coating source 92 is configured to apply a coating 98 to the substrate 96. The coating is a substance that reduces the adherence of the ink 100 to the substrate 96. For example, the coating can be an oil such as a silicone oil. The coating source 92 can be a variety of devices. For example, the coating source 92 can be sprayer, a roller, or the like to apply the coating 98.

The marking engine 94 is configured to apply the ink 100 over the coating 96. As a result, the coating is disposed between the ink 100 and the substrate 96. Hence, the adhesion of the ink 100 to the substrate 96 is reduced. The marking engine 94 can be a variety of devices for applying ink. For example, the marking engine 94 can include a print head to eject the ink on to the substrate. In another example, the marking engine 94 can include drums rollers, or the like in an offset printing technique. Regardless, the ink 100 is patterned with the coating 98 substantially between the ink 100 and the substrate 96.

In this example, the coating 98 is illustrated as pattered similar to the ink 100. However, the coating need not be patterned as the ink 100. For example, the coating 98 may extend across the substrate 96 while the ink 100 is patterned. Including such a coating 98 across the entire substrate 96 can provide an additional benefit in that subsequently applied marks, inks, or the like can have a reduced adhesion to the substrate 96. For example, the system 90 can produce a substrate 96 with a coating 98 across substantially all of a surface of the substrate 96. Users of the substrate 96 may annotate the substrate 96, take notes, or otherwise add material to the surface of the substrate 96. Although the ink 100 that was applied can be selected so that the adhesion to the substrate 96 can be controlled, such additional unknown materials can have potentially higher adhesion to the substrate 96. The coating 98 can form a barrier such that the unknown material may be removed along with the ink 100. For example, a user may annotate the substrate 96 with a conventional pen. The coating 98 can reduce the adhesion of the pen ink such that it can be removed along with the originally applied ink.

Although particular embodiments have been described, it will be appreciated that the principles of the invention are not limited to those embodiments. Variations and modifications may be made without departing from the principles of the invention as set forth in the following claims.

What is claimed is:

1. A system for removing ink from a substrate, comprising:
   providing a substrate having ink;
   an ink separator configured to separate the ink from the substrate, the ink separator comprising a blade having a first hardness, the substrate has a second hardness and the first hardness is less than the second harness;
   a substrate conveyor configured to provide the substrate to the ink separator; and
   a pressure controller arranged to control the pressure between the ink separator and the substrate conveyor.

2. The system of claim 1, wherein the ink separator is configured to mechanically separate the ink from the substrate.

3. The system of claim 1, wherein the ink separator is configured to only mechanically separate the ink from the substrate.

4. The system of claim 1, wherein:
the ink has a third hardness; and
the first hardness is greater than the third hardness.

5. The system of claim 1, wherein the blade is disposed in the ink separator to remove a portion of the substrate.

6. The system of claim 1, wherein the blade comprises a rotating blade.

7. The system of claim 1, further comprising an ink collector configured to collect the ink removed from the substrate.

8. The system of claim 7, wherein the ink collector comprises a brush and a vacuum.

9. The system of claim 7, wherein the ink collector comprises a blade and a vacuum.

10. The system of claim 1, further comprising a solvent source configured to apply a solvent to the substrate.

11. The system of claim 1, further comprising a scanner disposed after an exit of the ink separator and configured to analyze ink remaining on the substrate.

* * * * *